United States Patent
Ruan (10) Patent No.: US 9,512,958 B2
(45) Date of Patent: Dec. 6, 2016

(54) VISCO-ELASTIC SUPPORT WITH ADDED DYNAMIC STIFFNESS

(71) Applicant: ITT MANUFACTURING ENTERPRISES, LLC, Wilmington, DE (US)

(72) Inventor: Shubin Ruan, Williamsville, NY (US)

(73) Assignee: ITT Manufacturing Enterprises LLC, Wilmington, DE (US)

(*) Notice: Subject to any disclaimer, the term of this patent is extended or adjusted under 35 U.S.C. 154(b) by 297 days.

(21) Appl. No.: 13/840,340

(22) Filed: Mar. 15, 2013

(65) Prior Publication Data
US 2014/0265069 A1 Sep. 18, 2014

(51) Int. Cl.
| F16F 5/00 | (2006.01) |
| F16M 13/00 | (2006.01) |
| F16F 9/20 | (2006.01) |
| F16F 9/18 | (2006.01) |
| F16F 9/512 | (2006.01) |

(52) U.S. Cl.
CPC ............... *F16M 13/00* (2013.01); *F16F 5/00* (2013.01); *F16F 9/20* (2013.01); *F16F 9/182* (2013.01); *F16F 9/185* (2013.01); *F16F 9/512* (2013.01)

(58) Field of Classification Search
CPC .............. F16F 9/512; F16F 9/182; F16F 9/20; F16F 5/00; F16F 9/185
USPC ............. 267/116, 113, 119, 124, 130, 64.11, 118, 267/127
See application file for complete search history.

(56) References Cited

U.S. PATENT DOCUMENTS

| 2,771,968 A | 11/1956 | Mercier |
| 3,151,856 A | 10/1964 | Bresk et al. |
| 3,722,640 A * | 3/1973 | Taylor ..................... B60R 19/32 188/316 |
| 4,730,706 A * | 3/1988 | Taylor et al. ................. 188/297 |
| 4,867,286 A * | 9/1989 | Taylor ....................... F16F 9/20 188/268 |
| 5,209,632 A | 5/1993 | Ito |
| 5,286,013 A | 2/1994 | Seymour et al. |
| 5,477,949 A | 12/1995 | Forster et al. |
| 5,558,316 A | 9/1996 | Lee et al. |

(Continued)

FOREIGN PATENT DOCUMENTS

| FR | 1 003 657 | 3/1952 |
| FR | 2 286 981 | 4/1976 |

(Continued)

OTHER PUBLICATIONS

Extended European Search Report for EP 14 159 788.0; Dated Aug. 6, 2014; 9 pages.

*Primary Examiner* — Thomas Irvin
(74) *Attorney, Agent, or Firm* — Barclay Damon, LLP (57) ABSTRACT

A visco-elastic damping assembly includes a mount housing having first and second ends and a hollow interior. A piston assembly disposed within the mount housing includes axially opposed first and second piston rod ends in which the first piston rod end is defined by a first diameter and the second piston rod end is defined by a second diameter substantially larger than the first diameter. A high pressure hydraulic reservoir is defined within the mount housing wherein an applied load component acting on the second piston rod end causes corresponding movement of the piston assembly against fluid retained in the hydraulic reservoir, enabling a first static spring rate as well as a second higher dynamic spring rate.

23 Claims, 8 Drawing Sheets

(56) References Cited

U.S. PATENT DOCUMENTS

| | | |
|---|---|---|
| 6,264,015 B1 | 7/2001 | De Kock |
| 6,547,046 B2 | 4/2003 | Yamaguchi et al. |
| 7,284,644 B2 | 10/2007 | Cmich et al. |
| 7,694,785 B2 | 4/2010 | Nakadate |
| 7,975,814 B2 | 7/2011 | Söderdahl |
| 8,327,985 B2 | 12/2012 | Boyd et al. |
| 8,490,763 B2 * | 7/2013 | Vandine ................... 188/322.15 |
| 2005/0274214 A1 | 12/2005 | Pang |
| 2007/0205064 A1 * | 9/2007 | Horikawa et al. ............ 188/281 |
| 2011/0017557 A1 | 1/2011 | Nygren et al. |
| 2011/0056784 A1 * | 3/2011 | Richards .................. 188/322.15 |
| 2011/0226572 A1 | 9/2011 | Heyn et al. |

FOREIGN PATENT DOCUMENTS

| | | |
|---|---|---|
| JP | 61-165037 | 7/1986 |
| JP | 2004-019856 | 1/2004 |
| WO | WO 95/20111 | 7/1995 |

\* cited by examiner

VISCO-ELASTIC SUPPORT WITH ADDED DYNAMIC STIFFNESS

TECHNICAL FIELD

This application is directed to a axial visco-elastic mount/support for a device or apparatus, the mount providing a low static spring rate, but further configured in order to provide a significantly higher dynamic spring rate to dampen specifically applied loads imparted to the device or apparatus.

BACKGROUND

With regard to certain devices that are supported, such as hydro-electric generators, there is a need in terms of providing a mount which enables a low static spring rate for reasons of thermal stability and nominal support, among others. In the course of operation, low amplitude cyclic loads can also be imparted. There is a need to be able to provide greater dynamic stiffness of these mounts in order to buffer or dampen these vibratory loads. It would be very desirable to provide such discrete isolation in a single integrated device.

SUMMARY

To that end and according to one aspect, there is described a visco-elastic mount comprising a housing and a piston assembly axially disposed within said housing. The piston assembly includes a piston rod and a piston head, the piston rod extending substantially through the piston head and having a first end with a first diameter and a second opposing end with a second diameter that is substantially larger than the diameter of the first piston rod, the piston assembly being axially movable relative to a visco-elastic spring disposed within said housing. According to one version, the visco-elastic spring is defined by a reservoir containing elastomeric fluid under high pressure, the mount further including a charging valve assembly that admits and maintains fluid under high pressure within the reservoir.

According to another aspect, there is provided a method for manufacturing a visco-elastic mount with increased dynamic stiffness, said method comprising:

providing a housing;

disposing a piston assembly within said housing, said piston assembly including a piston head and a piston rod extending through the piston head;

providing a visco-elastic spring within said housing wherein said piston assembly is movable axially within said housing, said piston rod including a first axial end having a first diameter and an opposite axial second end having a larger diameter than the first end, such that axial loads applied to the second end of the piston assembly cause movement of said piston assembly against said visco-elastic spring, enabling a first static spring rate while further enabling a second higher dynamic spring rate.

One advantage provided by the herein described visco-elastic mount such as for use in hydro-electric generators is that a relatively low static spring rate can be maintained, allowing for thermal stability, but in which the larger diameter portion of the piston rod further enables a significantly higher dynamic spring rate relative to the visco-elastic spring to increase low amplitude cyclic loads and thereby providing enhanced damping.

Yet another advantage realized herein is that increased dynamic stiffness is realized in a single mount assembly.

These and other features and advantages will be readily apparent from the following Detailed Description, which should be read in accordance with the accompanying drawings.

DETAILED DESCRIPTION

The following relates to an exemplary embodiment of a visco-elastic mount for use with an apparatus, for example, supporting a hydro-electric generator apparatus. It will be readily apparent, however, that the principles applied to the exemplary mount herein described mount can be used and adjusted to provide different static and dynamic spring rates for other types of supported apparatus, depending on load characteristics. In addition and throughout the course of this discussion, several terms are frequently used in order to provide a suitable frame of reference with regard to the accompanying drawings, including "top", "bottom", "upper", "lower", "distal", "proximal", "first", "second" and the like. These terms, however, are not intended to limit the overall scope of the invention, as described and claimed herein.

The drawings provided herein are intended only to show salient features of the exemplary visco-elastic mount apparatus. To that end, these drawings are not necessarily drawn to scale and should not be relied upon for scaling and similar purposes.

As defined herein, the term "visco-elastic" refers to any material which is viscous but which also exhibits certain elastic properties, such as the ability to store energy of deformation, and in which the application of a stress gives rise to a strain that approaches its equilibrium value slowly.

As defined herein, the terms "a", "an", "the", and "said" means one or more than one.

As used herein, the terms "comprising", "comprises" and "comprise" are open-ended transitional terms used to transition from a subject recited before the term to one or more elements recited after the term, where the element or elements listed after the term are not necessarily the only elements that make up the subject.

As used herein, the terms "containing", "contains" and "contain" have the same open ended meaning as "comprising", "comprises" and "comprise.

As used herein, the terms "including", "includes" and "include" have the same open-ended meaning as "comprising", "comprises" and "comprise".

Figure 1:
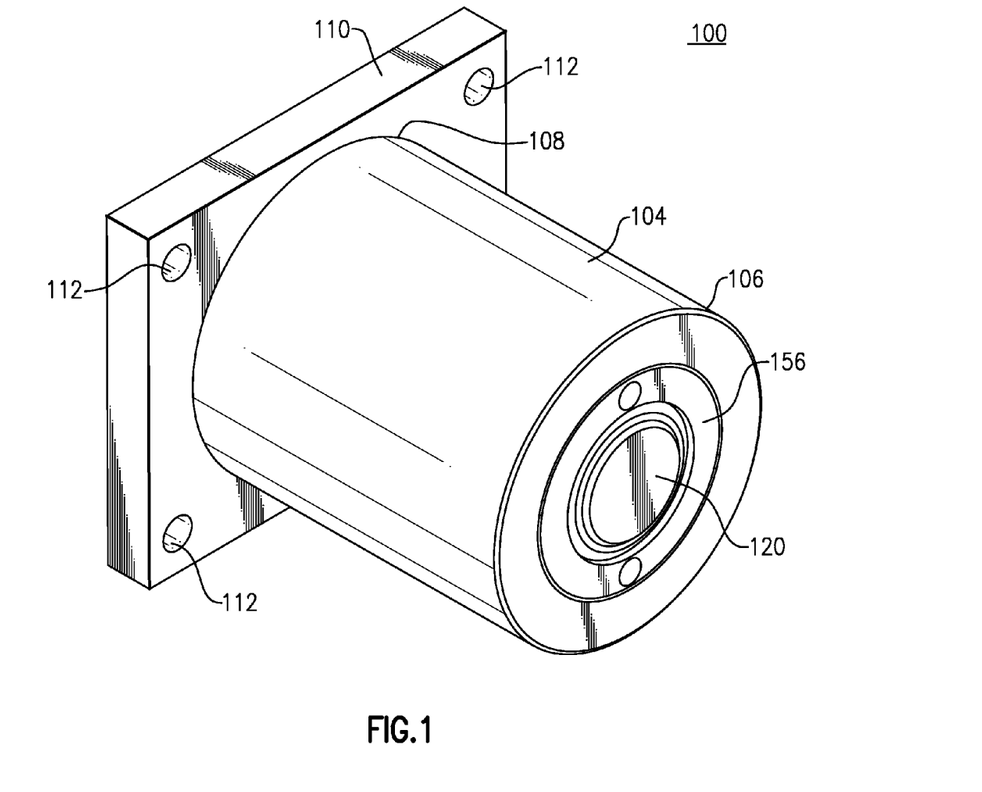
FIG. 1 is a front perspective view of a visco-elastic mount made in accordance with an exemplary embodiment.

Referring to the figures and more specifically to FIG. 1, there is shown a front perspective view of a visco-elastic mount, hereinafter referred to by reference numeral 100 that is made in accordance with an exemplary embodiment. The visco-elastic mount 100 includes a substantially cylindrical enclosure or mount housing 104 made from a suitable structural material, the mount housing 104 being hollow and defined by opposing first and second ends 106, 108, respectively, which further define first and second ends of the visco-elastic mount 100 itself. A mounting plate or bracket 110 is attached to the second end 108 of the mount housing 104 for securing the mount 100 to a fixed support (not shown). More specifically, the mounting bracket or plate 110 is defined as a planar rectilinear member having a center opening 111, as well as a set of mounting holes 112, the latter being disposed at respective corners of the mounting bracket 110.

As discussed herein, a plurality of components are retained within the hollow interior of the cylindrical housing 104 that enable static load and dynamic vibratory damping with regard to a load output that is coupled hereto.

Figure 2:
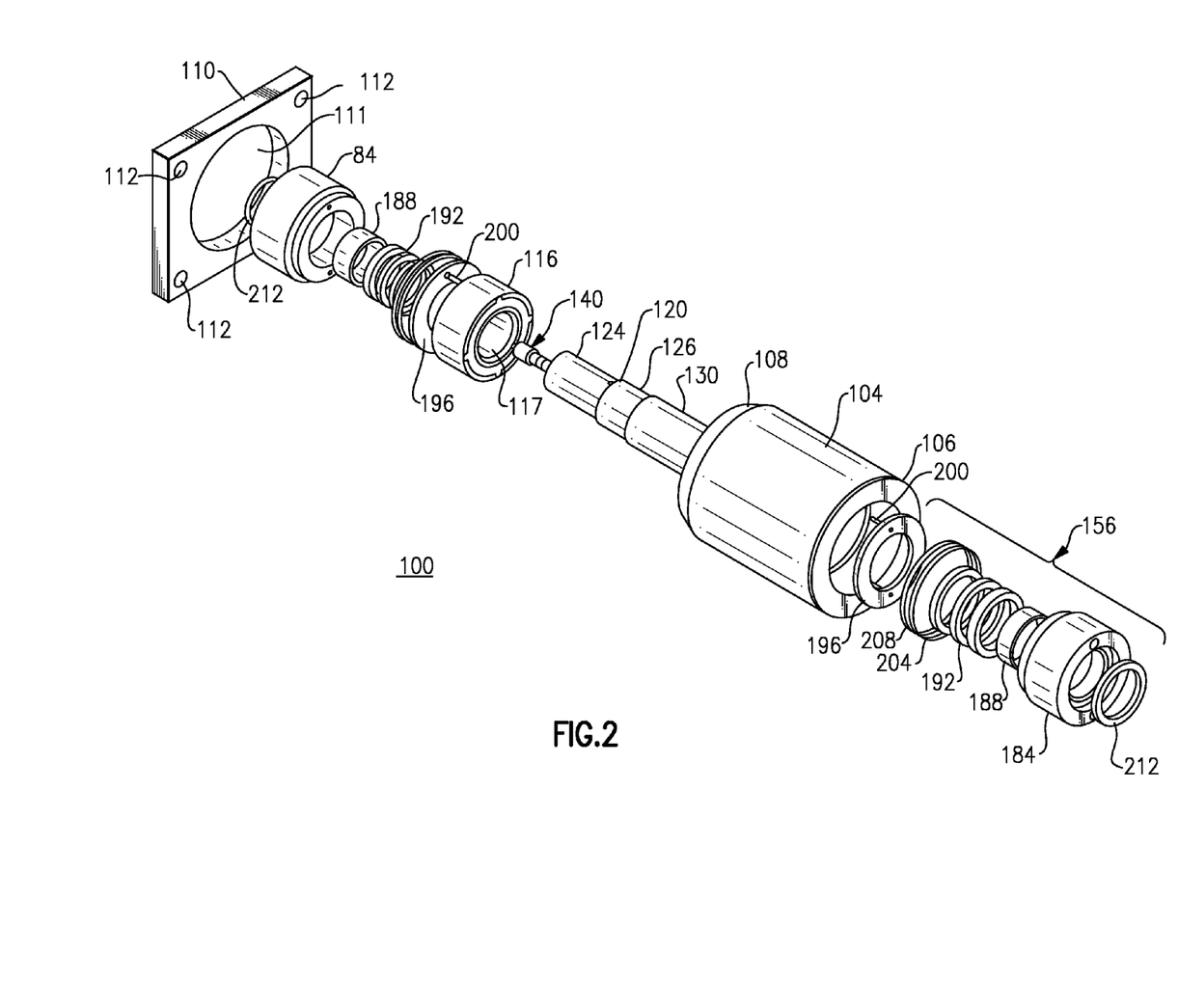
FIG. 2 is an exploded assembly view of the visco-elastic mount of FIG. 1.
Figure 3:
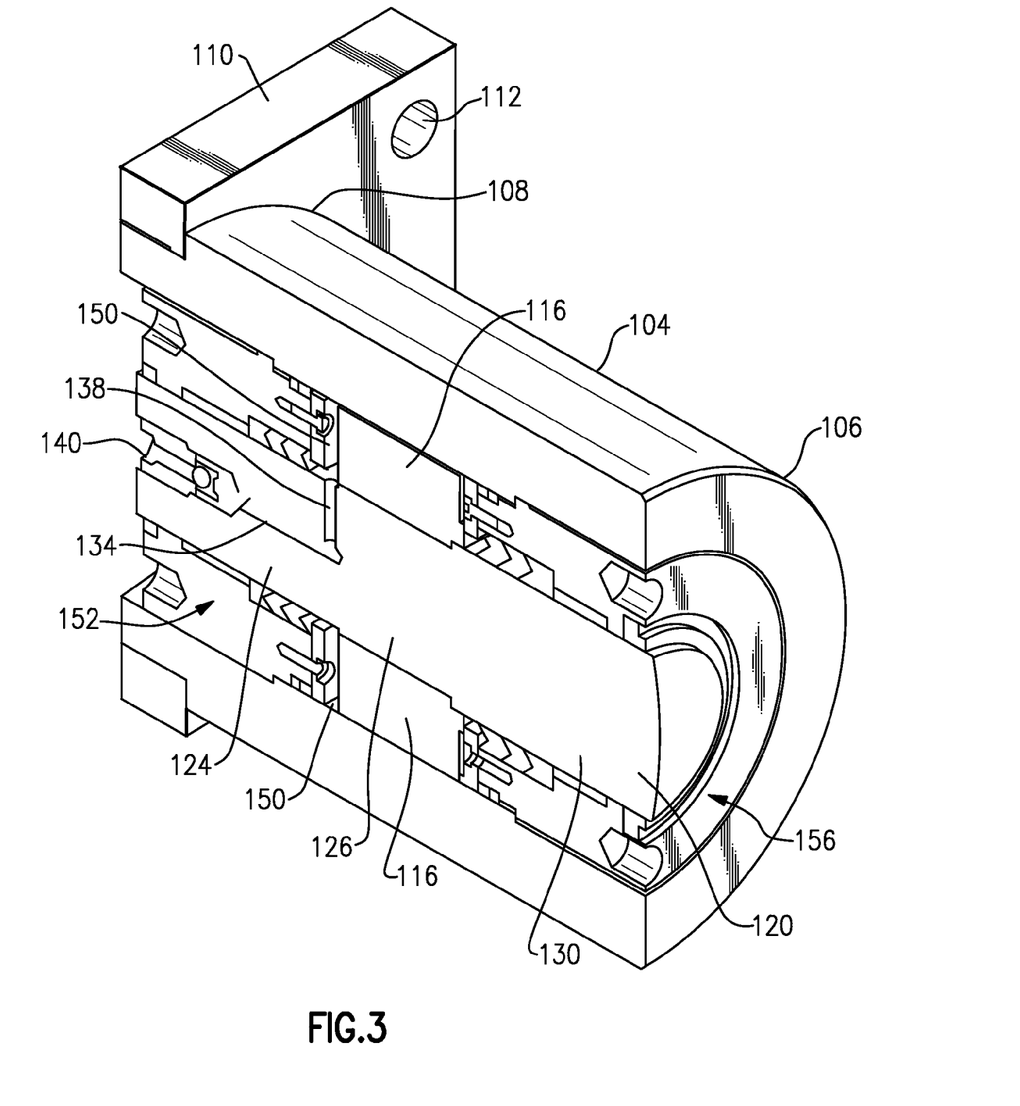
FIG. 3 is a sectioned side view of the visco-elastic mount of FIGS. 1-2.
Figure 4:
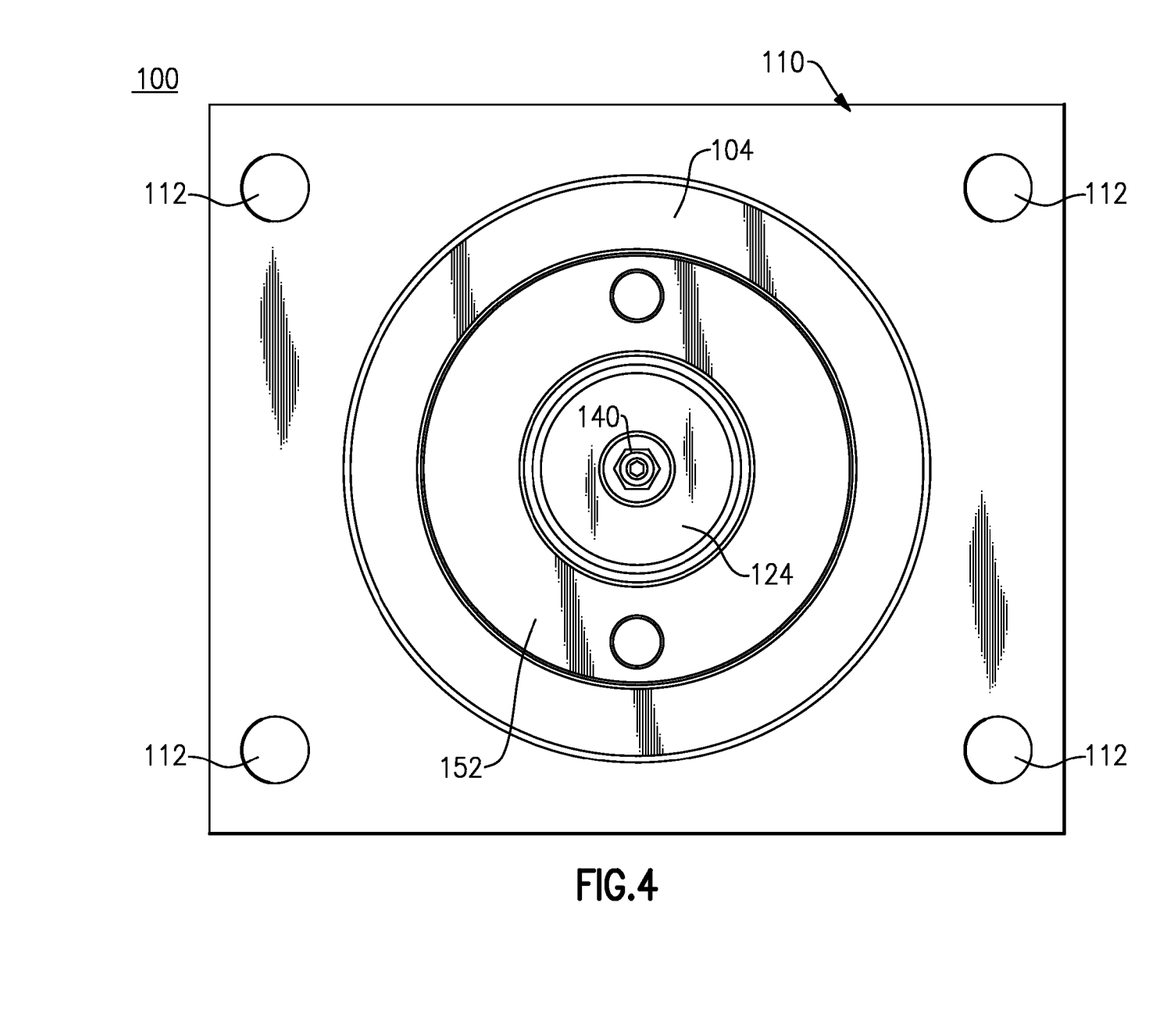
FIG. 4 is a rear end view of the visco-elastic mount of FIGS. 1-3.

These retained components are shown in exploded form in FIG. 2 and also according to a sectioned view of a fully assembled visco-elastic mount 100 in FIG. 3. More specifically and according to this exemplary embodiment, the mount housing 104 retains a piston assembly 114 as well as a pair of bearing assemblies; namely, a rear bearing assembly 152 and a front bearing assembly 156 provided at respective ends of the mount 100. The piston assembly 114 includes a piston head 116 and a piston rod 120, in which the piston head 116 is positioned at an intermediate portion of the piston rod 120, as shown more clearly in FIGS. 3 and 5. The piston head 116 is a cylindrical member having an axial through opening 117. The piston rod 120, according to this exemplary embodiment, is a substantially cylindrical member that is preferably made from steel and is defined by three (3) transitional axial sections. According to this embodiment, a first axial section 124 is defined by a first diameter that extends to an intermediate axial threaded section 126 and further extends to a third front or distal axial section 130.

Figure 5:
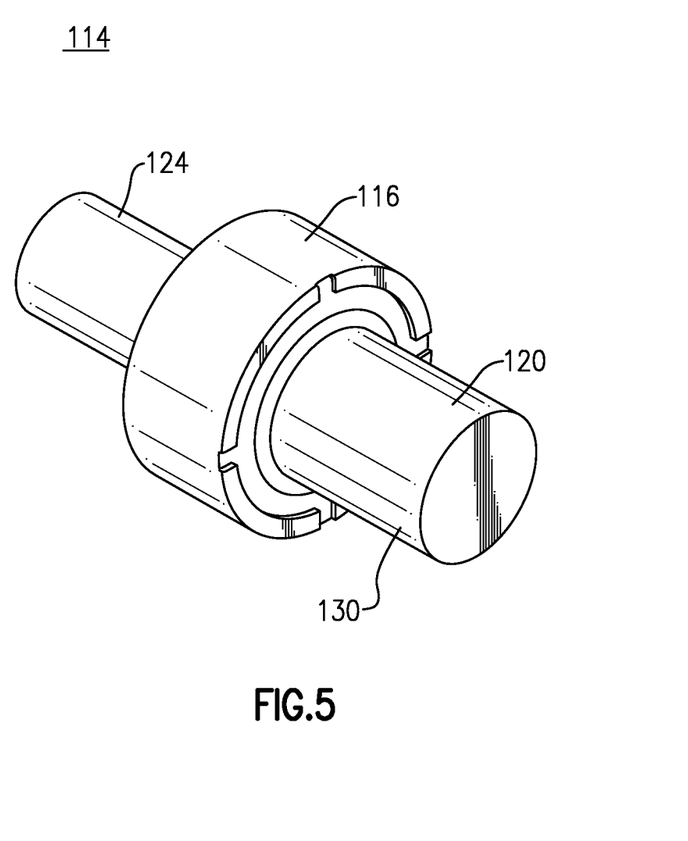
FIG. 5 is a perspective view of the piston assembly of the visco-elastic mount of FIGS. 1-4.

The third or distal axial section 130 of the piston rod 120 is defined by an outer diameter that is substantially larger than the outer diameter of the first axial section 124. According to this exemplary embodiment, the outer diameter of the first axial section 124 is about 58 mm and the outer diameter of the third axial section 130 is about 70 mm. The piston rod 120 is substantially a solid component with the exception of a pair of tubular cavities provided in the first axial section 124, as discussed herein. When assembled and as shown in FIG. 5, the piston head 116 is fixedly attached by threaded engagement with the intermediate threaded axial portion 126 of the piston rod 120 with the first axial section 126 and third axial sections 130 extending from opposing sides of the piston head 116.

As most clearly shown in FIG. 3, the first axial section 124 of the piston rod 120 is further defined by an axial tubular cavity 134 having a first diameter that tapers inwardly to a smaller second diameter at an intermediate depth, the tubular cavity 134 axially extending essentially though the entire first axial section 124. The first diameter of the axial tubular cavity 134 is sized to receive a charging valve assembly 140 through which a quantity of a hydraulic fluid can be added under high pressure. More specifically and according to this embodiment, the first axial section 124 of the piston rod 120 includes a transverse tubular cavity 138 extending radially through the piston rod 120 and connecting with the inner end of the extending axial tubular cavity 134. When assembled and still referring to FIG. 3, the interior of the housing 104 defines an annular space 150 between the distal end of the piston head 116 and the rear bearing assembly 152, which with the axial tubular cavity 134 and the transverse tubular cavity 138 of the piston rod 120 combine to form a hydraulic chamber, which is a high pressure fluid reservoir that is acted upon by the moving piston assembly 114, which receives an axial load at the front end of the piston rod 120, as discussed herein.

Figure 6A:
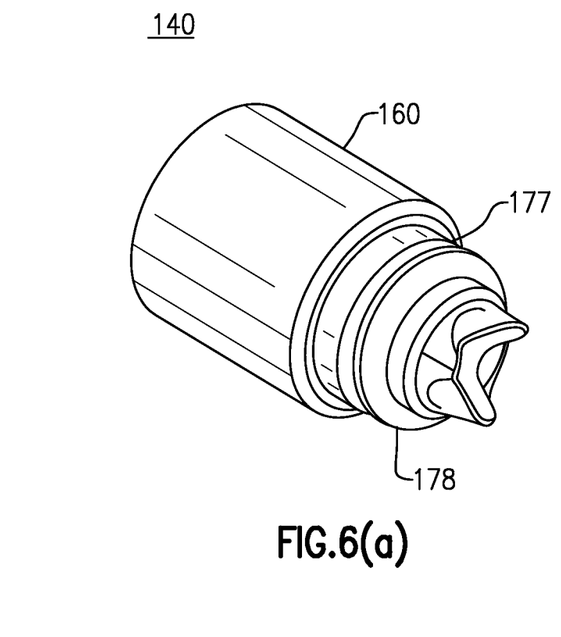
FIG. 6(a) is a front perspective view of a charging valve assembly of the visco-elastic mount of FIGS. 1-5.
Figure 6B:
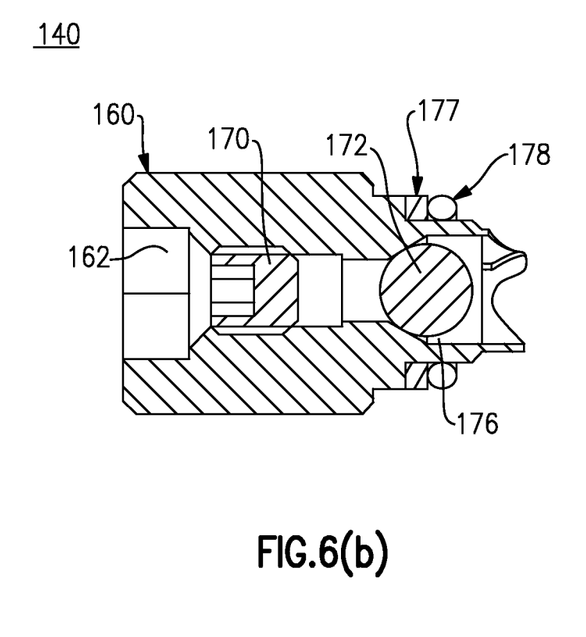
FIG. 6(b) is a side sectional view of the charging valve assembly of FIG. 6(a)

An exemplary charging valve assembly 140, shown in greater detail in FIGS. 6(a) and 6(b), includes a substantially cylindrical valve body 160 having an internal axial center cavity 162. The distal end of the center cavity 162 is defined by a widened diameter that tapers inwardly to a second diameter sized to receive a set screw 170. A check ball 172 is situated on the opposite side of the center cavity 162 relative to a ball seat 176 that provides a fluidic barrier. A back-up ring 177 and a sealing member, such as an O-ring 178, are provided along the exterior of the valve body 160 at the distal end to provide a fluidic seal against the axial tubular cavity 134 of the first axial section 124.

As shown in the assembled view of FIG. 3, the front and rear bearing assemblies 156, 152 are disposed at the first and second ends 106, 108 of the housing 104, respectively and more specifically about the extending third and first axial sections 130, 124 of the piston rod 120. When assembled, an annular spacing 150 is created between the rear bearing assembly 152 and the end of the piston head 116 that is closest to the first axial section 124 of the piston rod 120. This annular spacing 150 is provided adjacent the end of the transverse cavity 138 and receives the hydraulic fluid and creates a visco-elastic spring against which the piston assembly 114 engages upon application of a load against the front end of the piston rod 120.

Figure 7A:
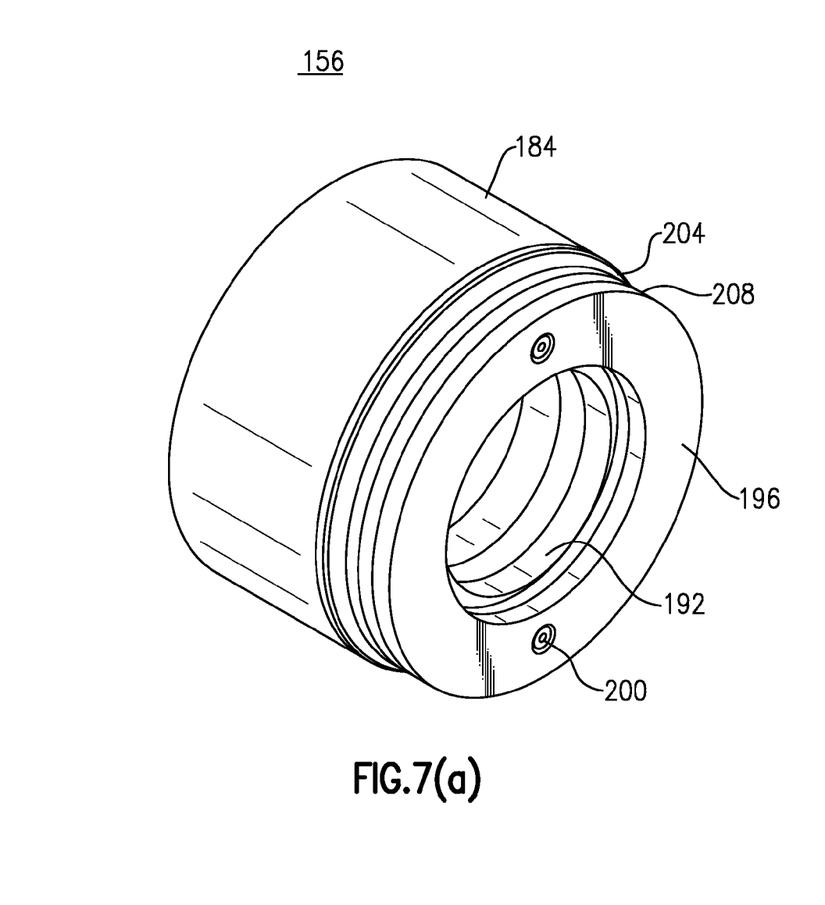
FIG. 7(a) is a front perspective view of a bearing assembly of the visco-elastic mount of FIGS. 1-5.
Figure 7B:
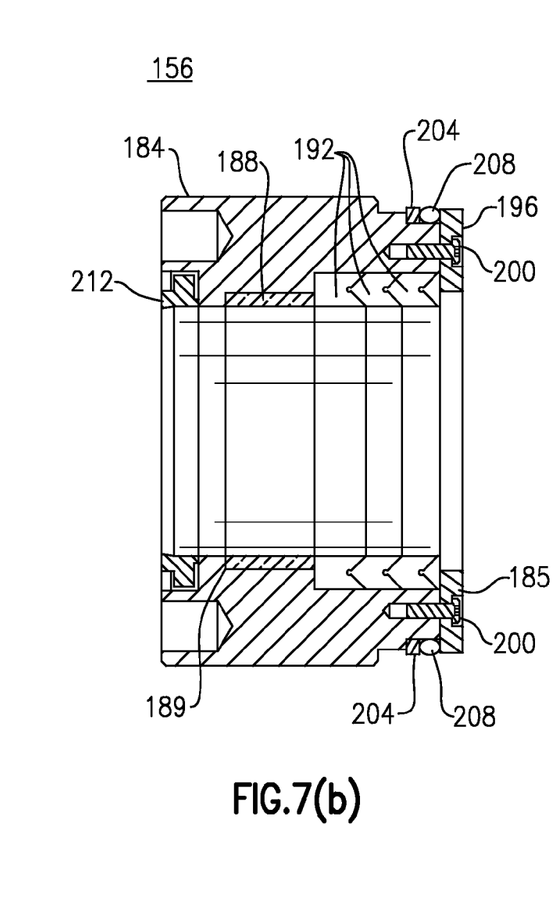
FIG. 7(b) is a side sectional view of the bearing assembly of FIG. 7(a)

An exploded view of the front bearing assembly 156 is depicted in FIGS. 7(a) and 7(b). More specifically, the front bearing assembly 156 is defined by a hollow cylindrical bearing retainer 184 having open ends. A rear bearing 188 is disposed within the interior of the bearing retainer 184 and engaged against an annular shoulder 189. The rear bearing 188 is a ring-like member having an interior and exterior surface. A set of rod seals 192 are disposed in side by side relation relative to the proximal end of the rear bearing 188, the rod seals 192 fitting within a recessed portion 185 of the bearing retainer 184. According to this exemplary embodiment, three (3) rod seals 192 are provided, each of the rod seals 192 being ring-like elements that have interior surfaces that are coplanar with the interior surface of the rear bearing 188. According to this embodiment, proximal facing surfaces of each rod seal 192 is defined by an inwardly directed tapers that are engaged by corresponding angled distal facing surfaces of an adjacent rod seal 192, thereby insuring each of the rod seals 192 are intimately engaged with one another. A seal retainer 196 covers the proximal end of the bearing retainer 184 and compressively engages against the rod seals 192 and rear bearing 188, the seal retainer 196 being a disc-like member secured to the proximal end of the bearing retainer 184 using low head cap screws 200 or other threaded fasteners, secured within mounting holes provided in the bearing retainer 184 in accordance with this exemplary embodiment. A back-up ring 204 and a sealing ring 208, such as an O-ring, are provided in side by side relation on the exterior surface of the proximal end of the bearing retainer 184 between the distal surface of the seal retainer 196 and a defined shoulder. A rod wiper 212 is provided at the distal opening of the front bearing retainer 184 within an annular slot. The bearing assembly 152 provides an interior surface against which the piston assembly 114 can move axially and also provides sealing with regard to the retained hydraulic fluid.

The remaining rear bearing assembly 152 is substantially a mirror image of the front bearing assembly 156, although assembled in reverse order, as shown in FIGS. 2 and 3. The only other substantial difference is that the retainer 184 of the rear bearing assembly 156 is smaller in terms of its interior diameter based on the decreased size (outer diameter) of the first axial section 124 of the piston rod 120. Otherwise, the rear bearing assembly 152 is literally identical, structurally, to that of the front bearing assembly 156 and therefore no further description is required.

In terms of assembly, the piston assembly 114 is placed within the interior of the mount housing 104 with the third axial section 130 facing the first end 106 of the housing 104 and the first axial section 124 facing the second end 108. The front and rear bearing assemblies 156, 152 can then be threadingly attached onto the first and second ends 106, 108 of the housing 104, respectively utilizing spanner wrench holes in the corresponding retainer assemblies 184 of each assembly 152, 156. When finally assembled within the housing 104 and prior to loading, the third axial section 130 of the piston rod 120 extends approximately 6.3 mm from the first end 106 of the housing 104 and the first axial section 124 is slightly inset within the second end 108 of the housing 104.

The mounting plate 112 secures the second end 108 of the housing 104 of the herein described visco-elastic mount 100 to a fixed support (not shown) using threaded fasteners (not shown) secured to each of the mounting holes 112.

Prior to mounting, the set screw 170 of the charging valve assembly 140 is loosened and removed from the valve body 160 and a quantity of a hydraulic elastomer is admitted into the axial tubular cavity 134 of the piston rod 120 under pressure sufficient to move the check ball 172 relative to the ball seat 176 and permit the fluid, such as a silicone elastomer, to flow through the internal center cavity 162 of the valve body 160 and into the axial and transverse tubular cavities 134, 138 defined within the first axial section 124 of the piston rod 120, in the defined annular spacing 150, and around the piston head 116. When admission of hydraulic fluid pressure ceases, the check ball 172 is reseated with the fluid being retained within the tubular cavities 134, 138 of the piston rod 120, in the annular spacing 150, and around the piston head 116, which combine to form a high pressure fluidic reservoir. Fluid is retained within the spacing 150, around the piston head 116, and cavities 134, 138 based on the various sealing elements (e.g., 204, 208, 192) of the bearing assemblies 152, 156.

Loads are transferred to the visco-elastic mount 100 from the front end 106 of the piston rod 120, and more particularly against the slightly extending third axial section 130 of the piston assembly 114. Initially, a relatively low static spring rate is realized wherein the initial static load causes axial movement of the piston assembly 114, and more particularly the differential volume created by the two different diameters 124, 130 of the piston rod 120 as the piston rod is compressed. The rod volume entering the mount housing 104 is greater than the rod volume leaving the mount housing 104. This differential causes the fluid to compress, thus providing a low static spring rate. During faster dynamic cycle movement, the fluid pressure created in the annular spacing 150 as the fluid flows around the piston head 116, and the increased structural stiffness provided by the third axial section 130 of the piston rod 120, provides a high dynamic spring rate that permits damping of certain low amplitude loads imparted to the mount 100 such as those, for example, created by hydroelectric power generators. Damping these latter vibrations produces increased life for the mounting structure, as well as overall smoother operation.

Figure 8:
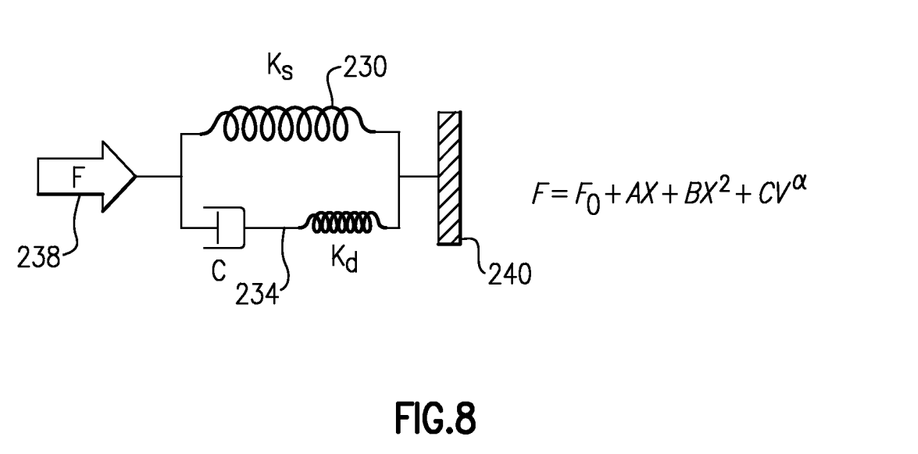
FIG. 8 depicts a mathematical model of the exemplary visco-elastic mount.

Referring to FIG. 8, a mathematical model of the herein described visco-elastic mount 100 is provided. As shown, a spring element 230 and a Maxwell element 234 are disposed in parallel relative to each other and to an applied load (F) 238 and fixed support 240. The spring element 230 is representative of the pressurized hydraulic fluid with the slow movement of the piston assembly 114 against the fluid under static load based on a spring rate $K_s$. The parallel Maxwell element 234 is defined by the piston assembly 114 and more particularly the piston rod 120 in which the increased diameter and thus structural stiffness of the third axial section 130 provides a second higher dynamic spring rate $K_d$ and the flow of fluid around the piston head 116 provides the damping element C that combine to form a high dynamic stiffness. In the represented equation, F0 represents the unit preload, AX and $BX^2$ represent the spring rate, with X being a function of displacement and $CV^\alpha$ representing the damping force, with V being a function of piston velocity.

PARTS LIST FOR FIGS. 1-8

100 visco-elastic mount
104 mount housing
106 first end, housing
108 second end, housing
110 mounting plate or bracket
111 center opening
112 mounting holes
114 piston assembly
116 piston head
117 axial through opening, piston head
120 piston rod
124 first axial section
126 second (intermediate) axial section
130 third axial section
134 axial tubular cavity, piston rod
138 transverse tubular cavity
140 charging valve assembly
150 annular spacing
152 rear bearing assembly
156 front bearing assembly
160 valve body
162 center cavity
170 set screw
172 check ball
176 ball seat
177 back up ring
178 O-ring
184 bearing retainer
185 recessed portion
188 bearing
189 annular shoulder
192 rod seals
196 seal retainer
200 cap screws
204 back-up ring
208 seal member
212 rod wiper
230 spring element 234 Maxwell element
238 applied load
240 fixed support The preferred forms of the invention described above are to be used for illustration only, and should not be used in a limiting sense to interpret the scope of the present invention. Obvious modifications to the exemplary embodiments set forth above could be readily made by those skilled in the art and without departing from the described present invention, including the following claims.

The invention claimed is:

1. A visco-elastic mount comprising:
a housing;
a piston assembly axially disposed within said housing, said piston assembly including a piston rod and a differential area piston head, said piston rod extending substantially through said piston head and having a first axial end having a diameter and stiffness, and a second opposing axial end having a diameter and stiffness that is substantially larger than the diameter and stiffness of the first axial end of said piston rod, said piston assembly being axially movable within said housing;
a first bearing assembly disposed in relation to the second axial end of the piston rod; and
a second bearing assembly disposed in relation to the first axial end of the piston rod wherein a first annular chamber is formed between the second bearing assembly and the piston head, and a second annular chamber is formed between the first bearing assembly and the piston head, said annular chambers providing a fluid-tight enclosure containing a compressible fluid which is preloaded by pressurizing the compressible fluid,
wherein, in a low frequency operating mode, the preloaded compressible fluid produces a low static spring rate which acts on the differential area piston head to: (i) bias the piston rod toward the second axial end, and (ii) react steady compressive loads, and wherein, in a high frequency operating mode, the preloaded compressible fluid produces a high dynamic spring rate to react oscillatory loads.

2. The visco-elastic mount as recited in claim 1, further comprising a charging valve assembly that admits and maintains fluid under high pressure within the defined hydraulic chamber.

3. The visco-elastic mount as recited in claim 2, wherein said charging valve assembly is fitted within a cavity in the first axial end of said piston rod, said cavity extending to said annular chambers.

4. The visco-elastic mount as recited in claim 2, wherein said first axial section of said piston rod has at least one tubular cavity, said charging valve assembly being disposed at a distal end of a said tubular cavity.

5. The visco-elastic mount as recited in claim 4, wherein said at least one tubular cavity forms part of said hydraulic chamber.

6. The visco-elastic mount as recited in claim 1, further comprising a mounting plate that fixedly supports said mount at a first end of said housing, said second axial end of said piston rod extending from a second end of said housing.

7. The visco-elastic mount as recited in claim 1, wherein said mount is configured for supporting a hydro-electric generator.

8. The visco-elastic mount of claim 1, wherein the steady compressive and dynamic oscillatory loads are expressed as a function of the relationship:

$$F(x)=F_O+AX+BX^2+CV^\alpha,$$

wherein F, A, B and C are constants greater than zero, X is the displacement of the piston head, V is the velocity of the piston assembly, and α is an integer/exponent.

9. A visco-elastic damping assembly comprising:
a mount housing having first and second ends and a hollow interior;
a piston assembly disposed within the hollow interior of said mount housing, said piston assembly including a differential area piston head and a piston rod extending through said piston head, said piston rod including a first end having a first diameter and stiffness, and a second end having a diameter and corresponding stiffness that is substantially larger than that of the first end; and
a hydraulic reservoir disposed within said housing against which said piston assembly is movable, said hydraulic reservoir defining first and second chambers sealed on each side of the piston head by a fluid-tight seal and containing a compressible fluid preloaded by pressurizing the compressible fluid, the hydraulic reservoir forming a visco-elastic damping element configured to produce a first static spring rate, in a low frequency operating mode, the preloaded compressible fluid acting on the differential area piston head and to bias the piston rod toward the second axial end of the piston assembly to react steady compressive loads or, alternatively, in a high frequency operating mode, the preloaded compressible fluid dampens dynamic loads imparted to the piston assembly.

10. The visco-elastic damping assembly as recited in claim 9, including a charging valve assembly disposed within a tubular cavity extending through the first axial end of said piston rod, said tubular cavity forming part of said hydraulic reservoir.

11. The visco-elastic damping assembly as recited in claim 9, including first and second bearing assemblies disposed about the first and second axial ends of said piston rod.

12. The visco-elastic damping assembly as recited in claim 9, wherein axial loads are initially transmitted through the second axial end of said piston rod.

13. The visco-elastic damping assembly as recited in claim 12, in which a portion of the hydraulic reservoir is disposed within the first axial section of said piston rod.

14. The visco-elastic damping assembly of claim 9, wherein the steady compressive and dynamic oscillatory loads are expressed as a function of the relationship:

$$F(x)=F_O+AX+BX^2+CV^\alpha,$$

wherein F, A, B and C are constants greater than zero, X is the displacement of the piston head, V is the velocity of the piston assembly, and α is an integer/exponent.

15. A visco-elastic mount for a hydroelectric generator, said mount comprising:
a mount housing having first and second ends and a hollow interior;
a mounting bracket attached to the second end of said mount housing and configured to fixedly secure said mount to a portion of said generator;
a piston assembly disposed within the hollow interior of said housing, said piston assembly including a differential area piston head and a piston rod extending through said piston head, said piston rod including a first axial end having a diameter and stiffness, and an axially opposed second end having a diameter and corresponding stiffness that is substantially larger than that of the first axial end, said piston assembly being movable within said housing and defining an annular gap between the housing and the differential area piston head, the housing and piston assembly defining first and second annular chambers on each side of the differential area piston head; and a hydraulic reservoir, including the first and second annular chambers, disposed within said housing and forming a visco-elastic spring, the first and second annular chambers containing a compressible fluid which is preloaded by pressurization of the compressible fluid;

wherein, in a first low frequency operating mode, the preloaded compressible fluid biases the differential area piston head toward the second axial end of the piston assembly thereby producing a first spring rate to react steady compressive loads and in a second high frequency operating mode, the preloaded compressible fluid in the first and second chambers, and oscillatory flow of fluid between the first and second chambers, produces a second spring rate higher than the first spring rate to dampen and reduce loads acting on the piston rod assembly.

16. The mount as recited in claim 15, wherein a portion of said hydraulic reservoir is disposed within said first axial end of said piston rod.

17. The mount as recited in claim 16, including a charging valve assembly disposed within a tubular cavity within said first axial end of said piston rod.

18. A method for providing dynamic damping in a mount system ordinarily designed to provide a static spring rate, said method comprising:

providing a piston assembly having a piston head and a piston rod, said piston assembly being movable within a hydraulic chamber containing a fluid preloaded by pressurizing a compressible fluid;

configuring the piston rod with a first axial end extending from said piston head having a diameter and a stiffness, an intermediate section, and an opposite second axial end extending from said piston head having a diameter which is larger than the diameter and stiffness of the first axial end;

defining an annular space between the piston assembly and each of the first and second axial ends of the mount housing, the annular space defining a portion of the hydraulic chamber containing the preloaded compressible fluid;

sealing each of the first and second axial ends by a fluid-tight seal; and applying axial loads to the second axial end of the piston rod to cause movement of said piston assembly wherein the preload pressurization of the contained compressible fluid in the hydraulic chamber creates a static spring rate, while the increased stiffness of the second axial end of the piston rod in combination with preload pressurization of the contained compressible fluid creates a higher dynamic spring rate to dampen low amplitude loads.

19. The method as recited in claim 18, in which said mount system is used for a hydroelectric power generator.

20. A visco-elastic mount comprising:

a housing;

a piston assembly movable within said housing, said piston assembly including a piston head and a piston rod extending through the piston head, the piston rod having first and second axial ends defining first and second diameters, respectively, the second diameter being larger than the first diameter to produce a differential area piston head, the piston assembly and housing, in combination, defining fluid-tight annular chambers on the first and second sides, respectively, of the piston head, and a compressible fluid filling the annular chambers and preloaded by pressurization of the compressible fluid;

wherein, in a low frequency operating mode, preload pressurization of the compressible fluid produces a low static spring rate which acts on the differential area piston head to bias the piston rod toward the second axial end, and react steady compressive loads, and wherein, in a high frequency operating mode, the preload pressurization of the compressible fluid produces a high dynamic spring rate to react oscillatory loads and dampen the motion of the piston assembly.

21. The visco-elastic mount of claim 20, wherein the steady compressive and dynamic oscillatory loads are expressed as a function of the relationship:

$$F(x)=F_O+AX+BX^2+CV^\alpha,$$

wherein F, A, B and C are constants greater than zero, X is the displacement of the piston head, V is the velocity of the piston assembly, and $\alpha$ is an integer/exponent.

22. The visco-elastic mount of claim 20, further comprising a first fluid tight seal enclosing the first annular chamber and a second fluid tight seal enclosing the second annular chamber.

23. The visco-elastic mount of claim 22, wherein the first and second fluid tight seals facilitate relative sliding motion between the piston rod and the housing.

* * * * *